United States Patent [19]
Winger

[11] 3,922,178
[45] Nov. 25, 1975

[54] ALKALINE BATTERY SEAL AND PROTECTIVE COATING COMPRISING A FATTY ACIDAMIDE

[75] Inventor: Jerrold Winger, Elyria, Ohio

[73] Assignee: Union Carbide Corporation, New York, N.Y.

[22] Filed: Aug. 28, 1973

[21] Appl. No.: 392,222

Related U.S. Application Data

[63] Continuation of Ser. No. 167,678, July 30, 1971, abandoned.

[52] U.S. Cl. .............................................. 136/133
[51] Int. Cl. .......................................... H01m 1/02
[58] Field of Search .......... 136/133, 178, 177, 169; 260/561 N

[56] References Cited
UNITED STATES PATENTS

| | | | |
|---|---|---|---|
| 3,442,716 | 5/1969 | Muraki et al. | 136/133 |
| 3,489,705 | 1/1970 | Zmitrovis | 117/6 X |
| 3,579,387 | 5/1971 | Voyentzie et al. | 136/178 |
| 3,647,557 | 3/1972 | Kegelman | 136/177 |
| 3,713,896 | 1/1973 | Feldhake | 136/133 |

Primary Examiner—Winston A. Douglas
Assistant Examiner—H. A. Feeley
Attorney, Agent, or Firm—C. F. O'Brien

[57] ABSTRACT

A fatty polyamide is employed as a seal or a protective coating in order to prevent alkaline electrolyte from wetting a surface in an alkaline galvanic cell.

15 Claims, 4 Drawing Figures

INVENTOR.
JERROLD WINGER

ALKALINE BATTERY SEAL AND PROTECTIVE COATING COMPRISING A FATTY ACIDAMIDE

This is a continuation of application Ser. No. 167,678, filed July 30, 1971, now abandoned.

The invention relates generally to alkaline galvanic cells, and more particularly to the use of fatty polyamide as a seal or protective coating to prevent alkaline electrolyte from wetting surfaces within the alkaline galvanic cell.

The ability of alkaline electrolyte to wet a metal surface is one of the major causes of leakage in alkaline galvanic cells. The alkaline electrolyte, by wetting the surface of a metal, can actually "creep" through a seal-metal interface. For this reason, elaborate precautions have been made to prevent the electrolyte in an alkaline cell from contacting the interface between a seal and certain metal parts of the cell such as the metal can, the negative current collector, and the like.

In addition to causing leakage, the ability of alkaline electrolyte to wet the surface of a metal can cause other problems. For instance, in air-depolarized alkaline cells, if electrolyte contacts the zinc electrode in the area of the juncture of the zinc electrode and a metal current collector, the zinc in this area is consumed during discharge of the cell. As a result, the zinc around the current collector can be completely consumed so that the current collector loses electrical contact with the zinc. Heretofore, no protective material has been available that would adhere to the zinc to protect it in a caustic medium.

The present invention provides a means for preventing the alkaline electrolyte in an alkaline cell from wetting a surface where such wetting is not desired. As a result, the invention provides a means for improving the leak resistance of alkaline galvanic cells, and also, it provides a means for protecting certain surfaces in an alkaline galvanic cell from being wet by and attacked by the alkaline electrolyte. Broadly, the invention provides a galvanic cell comprising a container having an alkaline electrolyte therein, the galvanic cell having at least one surface subject to wetting by said alkaline electrolyte, wherein said surface comprises a fatty polyamide, whereby said surface resists wetting by said alkaline electrolyte. The understanding of the invention is enhanced by the accompanying drawings wherein:

The fatty polyamides that are employed in the invention constitute a known class of compositions. For instance, fatty polyamides are described on pages 597 to 615 in Volume 10 of "The Encyclopedia of Polymer Science and Technology", Interscience Publishers (John Wiley and Sons, Inc.), New York. Briefly, fatty polyamides are produced by reacting a polybasic acid with a polyfunctional amine. Generally, the polybasic acids are principally dibasic acids formed by the dimerization of, for instance, a $C_{18}$ unsaturated fatty acid derived from an unsaturated vegetable oil. Such dimers are then reacted with a diamine such as ethylenediamine, propylenediamine, and the like.

Fatty polyamides are available commercially from, for instance, General Mills, Inc., Minneapolis, Minnesota, under the tradename of "VERSALON" and "GENBOND".

The fatty polyamide can be employed in any physical shape or configuration that is appropriate for the particular protective application to be performed. For instance, the fatty polyamide can be applied as a coating over a surface to be protected. Alternatively, the fatty polyamide can be employed as a seal, gasket, or other configuration.

In general, it is preferred that the fatty polyamide have an amine number of above about 90. The amine number is the number of milligrams of KOH equivalent to one gram of fatty polyamide, and is determined by known procedures such as ASTM D 2074-52T.

The fatty polyamide can be mixed with extenders, modifiers, and hardeners such as epoxy resins, in order to modify the physical properties of the fatty polyamide.

The fatty polamide can be applied by known procedures, as from a hot melt or from solution in a solvent such as an alcohol/aromatic hydrocarbon mixture. Methods of application of fatty polyamides are known to the art.

Among the specific commercially available fatty polyamides that are particularly effective in the invention is Swift's "Z-610" hot melt adhesive, available from Swift & Company, Adhesive Products Department, Chicago, Illinois. Swift's "Z-610" has an amine number of about 70. Other useful commercially available fatty polyamides that can be used in the invention are "GENBOND" 202, 205, and 209. These materials have amine numbers of about 10, 15 and 20 respectively.

Figure 1:
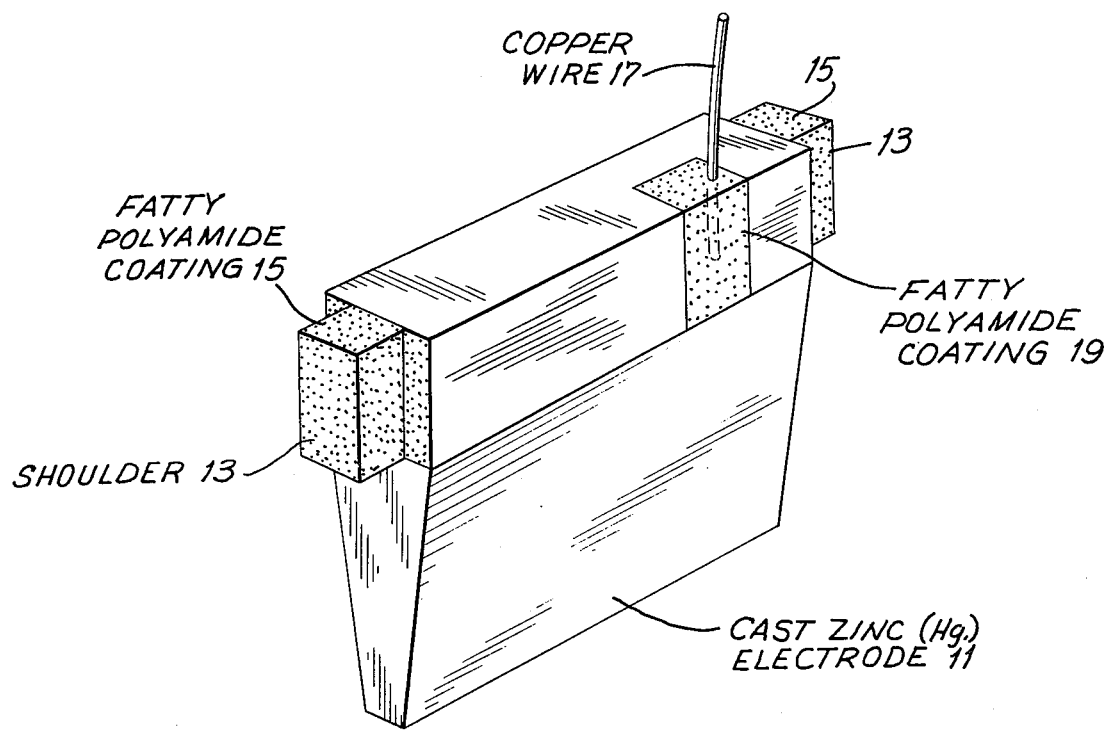
FIG. 1 is a perspective view of a cast zinc electrode suitable for use in an air-depolarized alkaline cell, wherein certain critical portions of the surface of the electrode have been coated with fatty polyamide in order to protect such areas from attack by the alkaline electrolyte.

Referring now to FIG. 1, one aspect of the invention is illustrated. FIG. 1 shows a cast zinc electrode 11 of the type that is employed in an air-depolarized alkaline cell. The electrode 11 shown is designed to rest on supports in the cell (not shown) and to extend down into the alkaline electrolyte. The shoulder portions 13 of the electrode 11 engage the supports in the cell such that the electrode 11 depends from said shoulders 13. In order to prevent the shoulders 13 from being consumed during discharge of the cell, said shoulders 13 are coated with fatty polyamide 15. This coating 15 prevents the alkaline electrolyte from contacting the zinc in the shoulders 13.

The current collector 17 that is employed in this type of cell can be a copper wire, as is shown in FIG. 1. In order to prevent the zinc surrounding the copper wire current collector 17 from being consumed during discharge of the cell, the surface of the zinc around the copper wire 17 is coated with a fatty polyamide coating 19. This coating 19 prevents the electrolyte from contacting the zinc in the area of the wire 17. The coating 19, therefore, prevents the zinc in the area of the current collector 17 from being consumed, which as noted above, can cause this current collector 17 to lose electrical contact with the zinc electrode 11.

Figure 2:
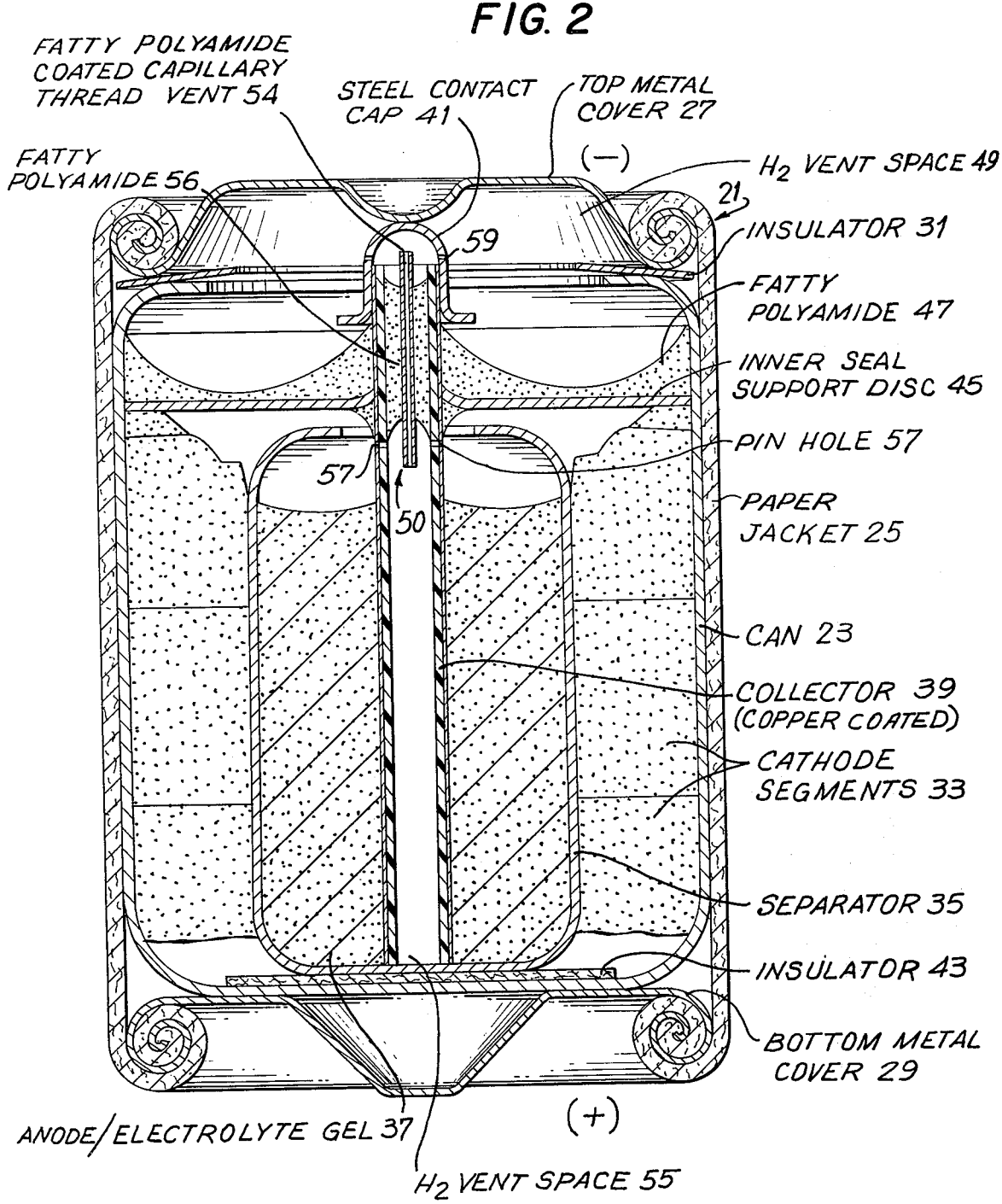
FIG. 2 is a cross-sectional side elevation of a sealed alkaline cell to which the principles of the invention have been applied.

FIG. 2 shows an alkaline cell 21 embodying certain aspects of the invention. The cell comprises a cupped metallic can 23, suitably constructed of steel or other rigid metal, that is surrounded by an insulating jacket 25. The extremities of the jacket 25 are spun around the outer edges of the top metal cover 27 (which is the negative terminal of the battery) and the outer edges of the bottom metal cover 29, which is the positive terminal of the battery. An insulator 31 electrically insulates the can 23 from the top metal cover 27. Snuggly fitting within the can 23 is a tubular cathode 33 suitably made of carbon and manganese dioxide, and lined on the inner surface therof with a separator 35.

Enclosed within the separator 35 is a semi-rigid tubular anode 37 formed by extruding a mixture of anode metal, an electrolyte, and an electrolyte-swellable binder. The anode metal is suitably powdered zinc, the electrolyte is suitably aqueous potassium hydroxide, and the electrolyte-swellable binder is suitably hydroxymethyl cellulose. The anode 37 is held firmly in place as a result of its own expansion occasioned by its absorbing alkaline electrolyte, to eventually press against the separator 35 at equilibrium. In FIG. 2, the anode electrolyte gel 37 is shown after swelling. A hollow, tubular current collector 39 extends all the way through the anode electrolyte gel 37 and is electrically connected to the top metal cover 27 of the can 23 through a metal contact cap 41. The separator 35 is electrically insulated from the bottom metal cover 29 by an insulator 43.

The cell closure for this alkaline cell includes an inner seal support disc 45 covered with a layer of fatty polyamide 47. The fatty polyamide 47 seals the entire upper cross-section of the cell, as shown, and contacts both the metal can 23 and the current collector 39. At the point of contact with the metal can 23 and the current collector 39, the fatty polyamide 47 prevents alkaline electrolyte from creeping around the inner seal support disc 45 and up into the hydrogen vent space 49.

Figure 3:
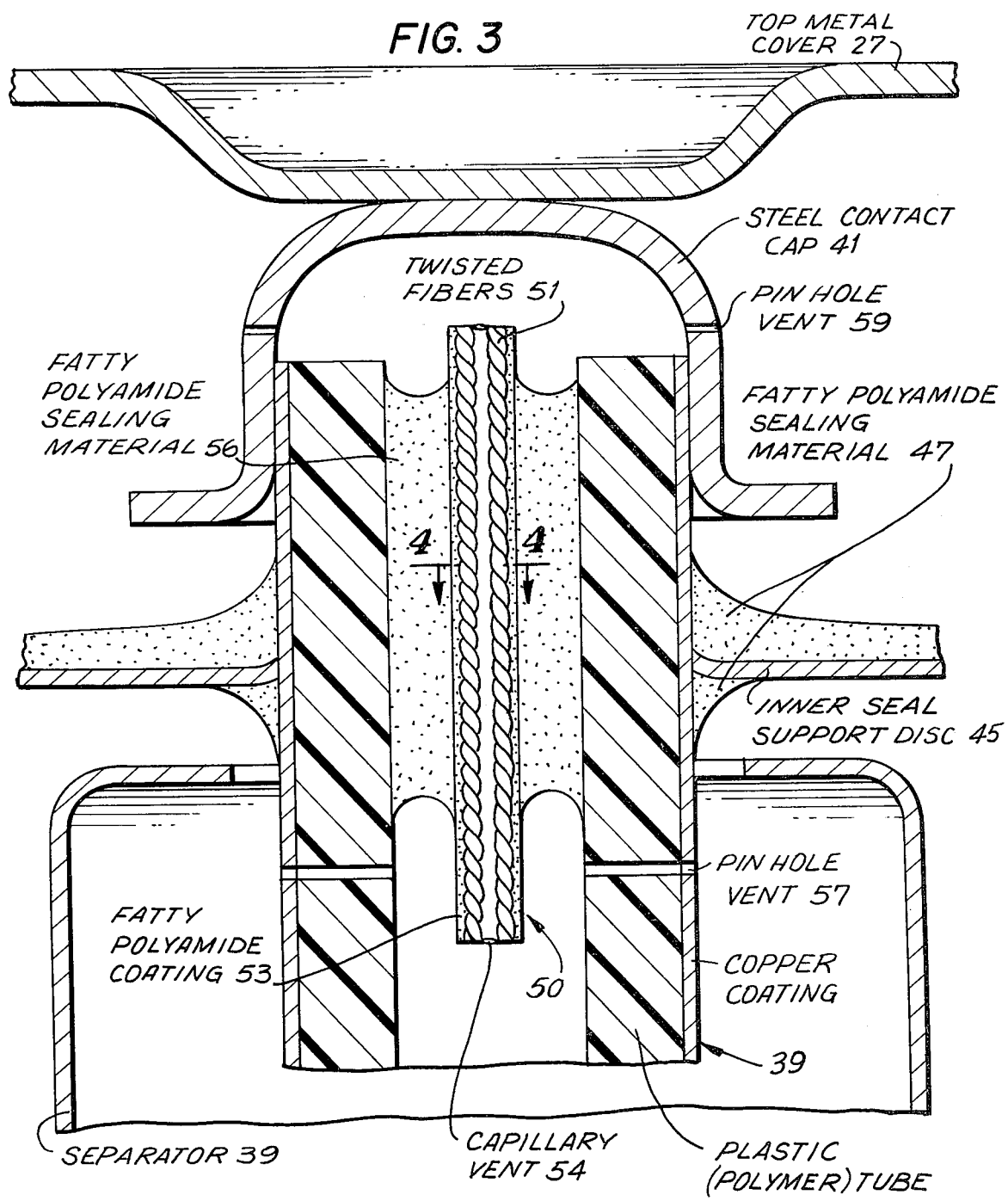
FIG. 3 is an enlarged view of the hydrogen gas venting system of the alkaline cell of FIG. 2, with the capillary gas vent shown schematically.
Figure 4:
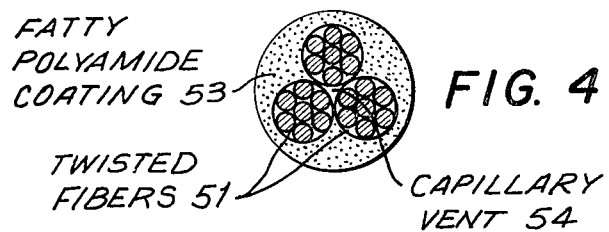
FIG. 4 is a cross-sectional view taken along line 4—4 of FIG. 3.

In another aspect of the invention, the hydrogen venting system makes use of fatty polyamide in order to prevent alkaline electrolyte from exuding from the cell through the vent mechanism. As shown in FIG. 2, and in enlarged view in FIGS. 3 and 4, the hydrogen vent system includes a fatty polyamide-coated fiber tube, shown generally as 50. The tube 50 includes twisted fiber threads 51 that are coated with a protective layer of fatty polyamide 53. The fiber threads 51 enclose a capillary gas path 54 for hydrogen to flow from the hydrogen vent space 55 within the current collector 39 out of the larger hydrogen vent space 49 between the seal 45 and 47 and the top metal cover 27 of the battery can. The tube 50 is sealed within the hydrogen vent space 55 with additional fatty polyamide 56. Hydrogen gas escapes from the interior of the battery through one or more pinholes 57 into the vent space 55 inside the current collector 39, and from there the gas flows through the capillary gas path 54 provided by the twisted fiber threads 51 into the space within the contact cap 41, and out of a pinhole 59 into the larger hydrogen vent space 49 at the top of the can. Conventional venting to the atmosphere is then provided. The fatty polyamide 53 and 56 surrounding the twisted fiber threads 51 prevents electrolyte from exuding out through the gas vent mechanism.

The foregoing discussion has described three discrete embodiments of the invention. Broadly, the invention contemplates the use of a fatty polyamide to prevent wetting by an alkaline electrolyte in a galvanic cell. The fatty polyamide is employed on any surface which it is desired to protect from wetting by alkaline electrolyte. In one example, a coating of fatty polyamide is employed at certain critical positions on a zinc electrode for use in an alkaline air-depolarized cell in order to prevent corrosive attack of the zinc by the electrolyte at these critical positions. In another embodiment, fatty polyamide is employed as the sealing means in a sealed alkaline galvanic cell in order to lessen the risk of leakage of electrolyte from the cell. And in a further embodiment, fatty polyamide is employed in a gas vent system in order to prevent electrolyte from leaking out through the gas vent system.

As has been indicated hereinabove, the fatty polyamide can be employed with a variety of substrates in order to guard against contact of alkaline electrolyte with said substrate. The substrate can be metal, fiber, plastic, and the like. It has been found that when a metal substrate is employed, the effectiveness of the protection afforded by the fatty polyamide can be determined, in part, by the nature of the substrate metal. For instance, when the positive collector is being protected from leaking by a fatty polyamide, an increasing degree of effectiveness is found in the series steel, stainless steel, nickel and nickel plated steel, and gold. With negative collectors, an increasing degree of effectiveness is found in the series zinc, brass, copper, gold plated copper, and gold.

The fatty polyamide can be employed in conjunction with other types of seals. For instance, with the nylon seal disclosed by Daley, et al. in U.S. Pat. No. 3,068,312, the effectiveness of this seal can be enhanced by coating fatty polyamide on the nylon seal and/or the metal parts that contact the nylon seal.

The invention can be employed in any alkaline cell. In addition to the zinc/$MnO_2$ and zinc/air cells described above, the invention can be employed in nickel/cadmium, silver oxide/zinc, mercuric oxide/zinc, and other cells employing an alkaline electrolyte such as aqueous KOH or NaOH.

The following example illustrates the practice of the invention:

EXAMPLE

In order to compare the performance of cells made in accordance with the invention with the performance of conventional cells, a series of silver oxide/zinc cells of the type used for hearing aids and watches were made. The cells were sealed with a nylon gasket, which in one case was left uncoated, and in the other cases was coated with either Swift's "Z-610" or with a hydrocarbon wax. The cells contained a conventional quantity of KOH electrolyte (15 milligrams) or a higher quantity of KOH electrolyte (20 milligrams). The cells were stored under room temperature conditions for 381 days, and then visually examined for salting (appearance of potassium carbonate on the exterior of the cell formed by reaction of KOH from the electrolyte with $CO_2$ from the atmosphere) and wetness (caused by absorption of moisture from the atmosphere by potassium carbonate).

The nylon gaskets were coated with the hydrocarbon wax by dipping once or twice (as indicated) in a heated solution of 135 grams of wax per liter of trichloroethylene. The "Z-610" fatty polyamide was applied from a solution of 20 percent by weight fatty polyamide in 50/50 (volume) isopropyl alcohol/toluene.

Table 1 below displays the results of these experiments. 35 to 40 Cells were evaluated in each series.

Table 1

Summary of Salting and Wetness of Hearing Aid Batteries after 381 Days at Room Temperature

| Series | Gasket | KOH Level | % OK | % Salted | % Wet |
|---|---|---|---|---|---|
| 1. | Uncoated | 15 mg | 2.6 | 97.4 | 66.7 |
| 2. | One Coat Wax | 15 mg | 43 | 57 | 53 |
| 3. | One Coat Z-610 | 15 mg | 95 | 5 | 0 |
| 4. | Two Coats Wax | 15 mg | 90 | 10 | 0 |
| 5. | Two Coats Z-610 | 15 mg | 98 | 2 | 0 |
| 6. | One Coat Wax | 20 mg | 13 | 87 | 80 |
| 7. | One Coat Z-610 | 20 mg | 84 | 16 | 0 |

The superior performance of the cells having the nylon gasket coated with "Z-610" is obvious.

What is claimed is:

1. A galvanic cell comprising a container having an alkaline electrolyte therein, said galvanic cell having at least one surface subject to wetting by said alkaline electrolyte and wherein at least a portion of said surface where such wetting is not desired consists of a mixture of a fatty polyamide having an amine number above about 10 and at least one modifier thereby substantially preventing creeping of said electrolyte over or through said portion of said surface.

2. A galvanic cell comprising a container having an alkaline electrolyte therein, said galvanic cell having at least one surface subject to wetting by said alkaline electrolyte and wherein at least a portion of said surface where such wetting is not desired consists of a mixture of a fatty polyamide having an amine number above about 10 and at least one extender thereby substantially preventing creeping of said electrolyte over or through said portion of said surface.

3. A galvanic cell comprising a container having an alkaline electrolyte therein, said galvanic cell having at least one surface subject to wetting by said alkaline electrolyte and wherein at least a portion of said surface where such wetting is not desired consists of a fatty polyamide having an amine number above about 10 thereby preventing creeping of said electrolyte over or through said portion of said surface.

4. The galvanic cell of claim 1 wherein said galvanic cell includes a cupped metal container made of a rigid metal and having said alkaline electrolyte therein, said cell being sealed at the open end of said cupped container by a seal closure having at least a portion consisting of a fatty polyamide and modifier mixture.

5. The galvanic cell of claim 2 wherein said galvanic cell includes a cupped metal container made of a rigid metal and having said alkaline electrolyte therein; said cell being sealed at the open end of said cupped container by a seal closure having at least a portion consisting of a fatty polyamide and extender mixture.

6. The galvanic cell of claim 3 wherein said galvanic cell includes a cupped metal container made of a rigid metal and having said alkaline electrolyte therein; said cell being sealed at the open end of said cupped container by a seal closure having at least a portion consisting of fatty polyamide.

7. The galvanic cell of claim 1 wherein said cell comprises an alkaline air-depolarized cell having a zinc electrode and a copper current collector electrically connected to said zinc electrode at a junction, and wherein the surface of said zinc electrode adjacent said junction is coated with a mixture of fatty polyamide and a modifier to prevent contact of said alkaline electrolyte with said surface.

8. The galvanic cell of claim 2 wherein said cell comprises an alkaline air-depolarized cell have a zinc electrode and a copper current collector electrically connected to said zinc electrode at a junction, and wherein the surface of said zinc electrode adjacent said junction is coated with a mixture of fatty polyamide and an extender to prevent contact of said alkaline electrolyte with said surface.

9. The galvanic cell of claim 3 wherein said cell comprises an alkaline air-depolarized cell having a zinc electrode and a copper current collector electrically connected to said zinc electrode at a junction, and wherein the surface of said zinc electrode adjacent said junction is coated with a fatty polyamide to prevent contact of said alkaline electrolyte with said surface.

10. The galvanic cell of claim 1 wherein said cell comprises an alkaline air-depolarized cell having a zinc electrode, said zinc electrode having at least one projection that is adapted to cooperate with a support for supporting said electrode, wherein the surface of said projection is coated with a mixture of fatty polyamide and a modifier to prevent alkaline electrolyte from contacting said projection.

11. The galvanic cell of claim 2 wherein said cell comprises an alkaline air-depolarized cell having a zinc electrode, said zinc electrode having at least one projection that is adapted to cooperate with a support for supporting said electrode, wherein the surface of said projection is coated with a mixture of fatty polyamide and an extender to prevent alkaline electrolyte from contacting said projection.

12. The galvanic cell of claim 3 wherein said cell comprises an alkaline air-depolarized cell having a zinc electrode, said zinc electrode having at least one projection that is adapted to cooperate with a support for supporting said electrode, wherein the surface of said projection is coated with fatty polyamide to prevent alkaline electrolyte from contacting said projection.

13. The galvanic cell of claim 1 wherein said cell includes a gas venting system that includes a plurality of fibers oriented generally in the direction of a gas path, said gas path being within said fibers, wherein said fibers are enclosed within the fatty polyamide and modifier mixture.

14. The galvanic cell of claim 2 wherein said cell includes a gas venting system that includes a plurality of fibers oriented generally in the direction of a gas path, said gas path being within said fibers, wherein said fibers are enclosed within the fatty polyamide and extender mixture.

15. The galvanic cell of claim 3 wherein said cell includes a gas venting system that includes a plurality of fibers oriented generally in the direction of a gas path, said gas path being within said fibers, wherein said fibers are enclosed within said fatty polyamide.

* * * * *

UNITED STATES PATENT OFFICE
CERTIFICATE OF CORRECTION

Patent No. 3,922,178　　　　　　　　　　Dated　November 25, 1975

Inventor(s)　Jerrold Winger

It is certified that error appears in the above-identified patent and that said Letters Patent are hereby corrected as shown below:

Column 2, line 17, "90" should read -- 9 --.

Column 4, line 51, the words "bon wax. The cells contained a conventional quan-" have been repeated.

Signed and Sealed this fourth Day of May 1976

[SEAL]

Attest:

RUTH C. MASON
Attesting Officer

C. MARSHALL DANN
Commissioner of Patents and Trademarks